2,649,913

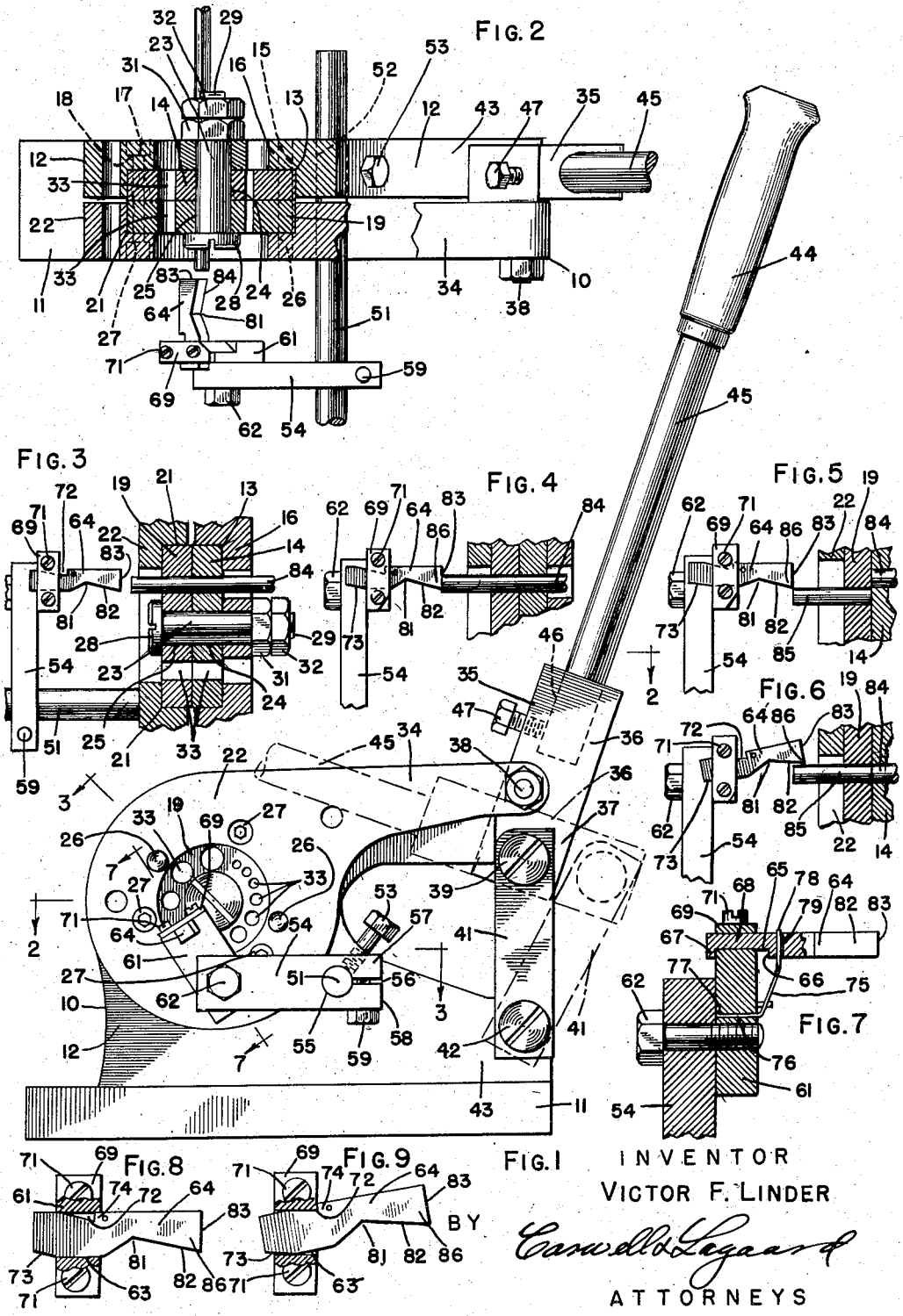
Aug. 25, 1953   V. F. LINDER   2,649,913
STOP DEVICE FOR ROD SHEARS
Filed March 31, 1949
INVENTOR
VICTOR F. LINDER
BY
ATTORNEYS Patented Aug. 25, 1953

UNITED STATES PATENT OFFICE 2,649,913

STOP DEVICE FOR ROD SHEARS

Victor F. Linder, Lake City, Minn., assignor to Albert T. O'Neil, Lake City, Minn.

Application March 31, 1949, Serial No. 84,513

8 Claims. (Cl. 164—59)

My invention relates to stop devices for rod shears and has for an object to provide a device whereby rods may be quickly and easily cut to length by merely feeding the rod into the shear and manipulating the cutting head of the shear.

An object of the invention resides in providing a stop device particularly adapted to be used with a shear having a fixed shear plate and a reciprocable shear plate cooperating therewith and formed with registering holes through which the rod to be cut may be projected and in which the plates overlie one another and the movable shear plate moves laterally of the holes of the fixed plate and carries the cut portion of the rod with it.

Another object of the invention resides in providing a stop device in which the cut portion of the rod may be ejected by feeding the uncut portion of the rod into the shear.

A still further object of the invention resides in providing a stop device with a stop piece having a surface engageable with the end of the rod being cut and in slidably and pivotally mounting the stop piece for movement toward and from the shear and in a direction out of the path of movement of the cut piece during ejection thereof.

An object of the invention resides in providing a stop device in which the stop piece is moved away from its normal position by engagement with the cut portion of the rod in the return movement of the movable shear plate.

Another object of the invention resides in providing the stop device with a mounting having a slot therein and in pivotally and slidably supporting the stop piece in said slot.

A still further object of the invention resides in constructing the stop piece with a part adapted to enter the guide and to restrain swinging movement of the stop piece when the stop piece is in one of its positions.

Other objects of the invention reside in the novel combination and arrangement of parts and in the details of construction hereinafter illustrated and/or described.

In the drawings:

Fig. 1 is an elevational view of a rod shear illustrating an embodiment of my invention applied thereto.

Fig. 2 is a plan sectional view taken on line 2—2 of Fig. 1.

Fig. 3 is a sectional elevational view taken on line 3—3 of Fig. 1.

Figs. 4, 5 and 6 are views similar to Fig. 3 showing the parts in altered positions.

Fig. 7 is a sectional view taken on line 7—7 of Fig. 1 and drawn to a greater scale.

Figs. 8 and 9 are plan views similar to Figs. 4 and 6 with portions of the keeper removed and drawn to the same scale as Fig. 7.

For the purpose of illustrating my invention I have shown in the drawing a rod shear 10 which is of the hand operated type. This shear comprises a base 11 having a shear block 12 mounted thereon. The block 12 is in the form of a flange and is integral with the base 11 and projects upwardly therefrom. At the uppermost portion of the shear block 12 is formed a cylindrical socket 13 in which is disposed a fixed cylindrical shear plate 14. Shear plate 14 is held from rotation in said socket by means of dowel pins 15 which extend through the said shear plate and also through the portion 16 of the shear block lying immediately in back of the plate 14. Said plate is held in position by means of fillister head screws 17 which are received in counterbored holes 18 in the portion 16 of shear block 12 and which screw into the plate 14. The exposed face of the shear plate 14 projects outwardly beyond the surface of the shear block 12 for a purpose to be presently described. The screws 17 and the dowel pins 15 alternate with one another and are disposed well beneath the exposed face of the shear plate.

Cooperating with the shear plate 14 is a movable cylindrical shear plate 19 which fits in a cylindrical socket 21 and formed in a shear head 22. Shear head 22 is pivoted to the shear block 12 by means of a bolt or pintle 23 which extends through holes 24 and 25 drilled into shear plates 14 and 19 at the axes of the same. The shear plate 19 is attached to the head 22 in the same manner as the shear plate 14 by means of dowel pins 26 and screws 27. The bolt 23 has a head 28 which engages the outer surface of the shear plate 19 and a threaded end 29 extending outwardly beyond the shear block 12. On this portion of the bolt are screwed a nut 31 and a jam nut 32 which hold the two plates 14 and 19 with the facing surfaces of the same in contact. Extending through both the plates 14 and 19 are holes 33 which are adapted to register with one another and which are of different sizes as illustrated in Fig. 1. When a rod of proper dimensions is inserted into the corresponding holes 33 and the shear head 22 given a slight amount of rotation about the bolt 23 relative to one another the rod is sheared off.

For the purpose of operating the shear head 22 the said head is formed with an arm 34 extending outwardly therefrom. A lever 35 has an arm 36 and an arm 37 and is pivoted by means of a bolt 38 to the end of the arm 34. The arm 37 has pivoted to it by means of a bolt 39 one end of a link 41 which link is pivoted at its other end by means of a bolt 42 to a portion 43 of the shear block 12. A handle 44 is mounted on a rod 45 which rod is secured within a socket 46 formed in the end of the arm 36 of lever 35. This rod is held in position by means of a set screw 47 screwed into the arm 36. It will readily be seen that by swinging the lever 35 from the position shown in full lines in Fig. 1 to that shown in dotted lines in said figure, that the shear head 22 rocks a small amount and moves the holes 33 in the plate 19 circumferentially with respect to the corresponding holes in plate 14 to cause a rod inserted through any of said holes to be sheared off at the meeting surfaces of the two plates 14 and 19.

The invention proper comprises a support 51 which is in the nature of a cylindrical rod and which extends through a hole 52 in the shear block 12. This rod may be adjusted transversely of the shear and is held in adjusted position by means of a set screw 53 screwed into the shear block 12.

The invention further comprises a bracket 54 which is drilled as indicated at 55 to receive the rod 51. The said bracket has a slit 56 formed in the same which intersects the hole 55 leaving two spaced parts 57 and 58. A cap screw 59 passes through the part 58 and is threaded into the part 57 and serves to bring these parts together to clamp the bracket 54 upon the rod 51.

The free end of the bracket 54 has attached to it a mounting 61. Mounting 61 is in the form of a short rectangular bar and is threaded to receive the threaded shank of a cap screw 62 which passes through the outer end of the bracket 54. The mounting 61 as best shown in Figs. 8 and 9 is formed with a transverse groove 63 at its outermost end and which forms a guide for slidably supporting a stop piece 64. Stop piece 64 as shown in Fig. 7 is constructed from a short bar and is milled transversely across the underside thereof to provide a transverse groove therein designated at 65. This construction forms a shoulder 66 and a lug 67 spaced from said shoulder a distance greater than the width of the mounting 61. The groove 63 is of substantially the same width as the stop piece 64 and the intervening portion 68 of the said stop piece between the shoulder 66 and lug 67 is of substantially the same thickness as the depth of said groove. Overlying the stop piece 64 is a keeper 69 which is secured to the end of the mounting 61 by means of cap screws 71 which pass through said keeper and are screwed into the end of the mounting 61. By means of the groove 63 and the keeper 69 a guide is formed for guiding the stop piece 64 for sliding movement transversely of the shear and in the direction of the length of the rod to be sheared.

The stop piece 64 has a notch 72 formed in the same on one side thereof and a bevel 73 formed in the same on the opposite side thereof. When the parts are disposed as shown in Fig. 6 or 9 the stop piece may swing a limited amount from the position shown in Fig. 8 to that shown in Fig. 9. The corner 74 formed by the notch 72 serves as a latch for restraining lateral movement of the stop piece 64 when the portion of said stop piece having the corner 72 enters into the groove 63. The parts are then latched and the stop piece restrained from swinging movement. The stop piece 64 is held in the position shown in Figs. 3 and 7 by means of a spring 75. This spring passes through a hole 76 in the mounting 61 and has a key 77 bent outwardly therefrom and which is clamped in position between the said mounting and the bracket 54. The other end 78 of spring 75 extends loosely through a hole 79 in the stop piece 64. Spring 75 is so tensioned that the said spring urges the stop piece to swing in a clockwise direction as viewed in Fig. 3 and to move toward the shear. The stop piece 64 has a recess 81 formed in the same providing a beveled surface 82 which intersects the surface 83 at the end 86 of the stop piece and which is the surface adapted to be engaged by the rod to be sheared. When the stop piece 64 is moved to the position shown in Figs. 6 and 9 the surface 82 is substantially parallel to the axis of the rod being sheared.

The method of operation of the invention is as follows:

The surface 83 of the stop piece 64 is adjusted so that the same comes opposite the hole 33 corresponding to the size of the rod to be sheared. This may be accomplished by loosening screw 59 and turning the bracket 54 about the axis of the rod 51 and by loosening the screw 62 and similarly rotating the mounting 61 about the axis thereof. When positioned to correspond with one pair of the holes 33 the parts become disposed as shown in Fig. 1. At the same time the bracket 54 is moved along the rod 51 so that the distance between the shearing surfaces of the shear plates 14 and 19 and the surface 83 of said stop piece when the stop piece is in the position shown in Fig. 8 will be the same length as the length of the sheared part of the rod. When a rod is to be sheared the same is directed through the registering holes in the shear plates as shown in Fig. 3. In Figs. 3 to 6 a rod being sheared is designated by the numeral 84. The rod upon being further advanced engages the surface 83 of the stop piece 64 and moves the same away from the shear until the shoulder 66 engages the mounting 61. The parts then become arranged as shown in Figs. 5 and 8. While so holding the rod 84 the handle 44 may be manipulated and the shear head 22 rotated relative to the block 12 to shear off the rod. During such movement the cut portion 85 of the rod moves with the shear head 22 sliding along the surface 83 until the said rod clears the end 86 of the stop piece. In Fig. 5 the cut portion of the rod is just about to clear the surface 83. The cut portion may now travel beyond the said stop piece. As soon as the cut portion 85 of the rod clears the surface 83, the spring 75 forces the stop piece back to the position shown in Fig. 1. The cut portion 84 may now engage the surface 82 of the stop piece. When the handle 44 is moved in reverse direction the said stop piece is swung rearwardly until it reaches the position shown in Fig. 6 in which the sheared portion is in alignment with the rod proper. The rod 84 may then be fed through the holes 33 pushing the cut portion ahead of it. As soon as the cut portion clears the movable shear plate, spring 75 exerts pressure on the cut portion 85 tending to move it away from the uncut portion of the rod and aided by gravity ejects the cut portion fom the shear. As soon as this occurs the stop piece 64 immediately flips back into alignment with the particular hole through which the rod 84 is projected and the surface 83 is in position to engage the new end of the rod 84 as the rod is advanced through the machine. The stop piece 64 is then in the position shown in Fig. 3 and is ready to intercept the movement of said rod to cut off the next portion of the rod.

Changes in the specific form of my invention, as herein described, may be made within the scope of what is claimed without departing from the spirit of my invention.

Having described my invention, what I claim as new and desire to protect by Letters Patent is:

1. In a stop device for use with a rod shear, said device including a support, a mounting carried by said support, a stop piece having a surface for engagement with the end of a rod being sheared, guide means on said mounting for guiding said stop piece for movement in the direction of the length of the rod and along the path of movement thereof, said surface of the stop piece in the normal position of the stop piece being nearest said shear, a shoulder on said stop piece limiting movement of the same away from the shear, said stop piece having a reduced portion accommodating independent limited lateral movement within said guide when the stop piece is in normal position and resilient means urging said stop piece toward normal position and resisting lateral movement thereof in one direction.

2. In a stop device for use with a rod shear, said device including a support, a mounting carried by said support, a groove in said mounting parallel with the axis of the rod being sheared, an elongated stop piece slidable along said groove and having an end surface for engagement with the end of the rod being sheared, a shoulder on said stop piece adapted to engage said support to limit movement of said surface away from said shear, said stop piece having a notch in the same at the locality of said shoulder and accommodating independent lateral movement of said stop piece, said stop piece having a part adapted to be received in said slot prior to engagement of the shoulder with the mounting and restraining lateral movement of the stop piece in all directions and resilient means for urging said stop piece toward said shear and for resisting lateral movement of the stop piece when in normal position in one direction.

3. A stop device for use with a rod shear having a fixed shear plate and a movable shear plate formed with registering holes through which the rod to be cut may be projected and in which the plates overlie one another and the movable shear plate moves laterally of the hole in the fixed plate in a certain direction to cut the rod and carries the cut portion of the rod with it, said stop device including a support fixed relative to the shear, a mounting on said support, a guide in said mounting having a guideway extending in the direction of the length of the rod being cut, a stop piece slidably and pivotally mounted in said guideway and having a surface for engagement with the end of the rod being cut, a shoulder on said stop piece adapted to engage said mounting to limit movement of said stop piece toward said mounting and a part on said stop piece adapted to enter said guideway and engage said guide to restrain pivotal movement of the stop piece when the shoulder is in engagement with the mounting and resilient means for resisting sliding and pivotal movement of said stop piece.

4. A stop device for use with a rod shear, said device including a support, a mounting carried by said support and having a surface facing the shear and an oppositely facing surface, said mounting being formed with a groove extending across the same and through said surfaces, a stop piece disposed in said groove and slidable therein, said stop piece having an end surface for engagement with the end of the rod being sheared, a shoulder on said stop piece for engagement with one of said surfaces to limit movement of the stop piece in one direction, another shoulder on said stop piece adapted to engage the other surface of said mounting to limit movement of the stop piece in the opposite direction, said stop piece being reduced in width at certain localities with respect to said groove to accommodate lateral movement of the same and resilient means for urging movement of said stop piece to bring one of said shoulders in engagement with the corresponding surface of said mounting.

5. A stop device for use with a rod shear, said device including a support, a mounting carried by said support and having a surface facing the shear and an oppositely facing surface, said mounting being formed with a groove extending across the same and through said surfaces, a stop piece disposed in said groove and slidable therein, said stop piece being of a thickness greater than the depth of said groove and having a transverse groove therein making the thickness of said stop piece at said groove less than the depth of the first named groove and forming on said stop piece oppositely facing shoulders for engagement with the oppositely facing surfaces of said mounting, said second named groove being of a width greater than the length of said first named groove to accommodate sliding movement of said stop piece along said first named groove, a keeper overlying said mounting and closing said first named groove to form a guide for said stop piece and resilient means for moving said stop piece laterally in the groove in said mounting.

6. A stop device for use with a rod shear, said device including a support, a mounting carried by said support, a groove in said mounting parallel with the axis of the rod being sheared, an elongated stop piece slidable along said groove and having an end surface for engagement with the end of the rod being sheared, a shoulder on said stop piece adapted to engage said support to limit movement of said surface away from said shear, said stop piece having a notch in the same at the locality of said shoulder and accommodating lateral movement of said stop piece, said stop piece in one position being in alignment with said rod and in another position inclining away from said rod, said stop piece having a recess therein providing a surface extending substantially parallel with the axis of said rod when said stop piece is in its second named position and adapted to receive the sheared portion of the rod and resilient means for urging said stop piece laterally in said groove and in a direction to bring said stop piece into inclining position with reference to the rod.

7. A stop device for use with a rod shear having a fixed shear plate and a movable shear plate formed with registering holes through which the rod to be cut may be projected and in which the plates overlie one another and the movable shear plate moves laterally of the hole in the fixed plate in a certain direction to cut the rod and carries the cut portion of the rod with it, said stop device including a support fixed relative to the shear, a mounting on said support, a guide in said mounting having a guideway extending in the direction of the length of the rod, a stop piece slidably and pivotally mounted in said guideway and having a surface for engagement with the end of the rod being cut, a shoulder on said stop piece adapted to engage said mounting to limit movement of said stop piece toward said mounting, said stop piece being reduced in width with respect to said guide at certain localities to accommodate lateral swinging of said stop piece out of alignment with the axis of the rod said stop piece having a surface thereon adapted to be engaged by the cut part of the rod in the return movement of said movable shear plate and to be moved out of alignment by said portion of the rod to permit the uncut portion of the rod to engage the cut portion and eject the cut portion from the movable shear plate and resilient means for urging said stop piece toward the position in which it is out of alignment with the rod.

8. In a stop device for use with a reciprocating rod shear to determine the length of the rods sheared, said device including a support, a mounting carried by said support and having a groove therein forming in said mounting lateral walls parallel with the axis of the rod being sheared and disposed substantially at right angles to the direction of movement of the shear plate, an elongated stop piece slidable along said groove and having surfaces engaging the denoted walls of said mounting formed by said groove and restraining lateral movement of the stop piece in the direction of movement of the shear plate and when the stop piece is in its most receded position, a shoulder on said stop piece engaging said mounting and limiting sliding movement of said stop piece to said receded position, said stop piece having a notch therein extending through one of said surfaces thereof and accommodating swinging movement of the stop piece laterally and in the direction of the return movement of the shear plate when the stop piece is in its most protruded position said notch receiving a portion of the support at one end of the groove and resilient means for urging said stop piece toward its most protruded position and in the direction of the cutting movement of the shear plate.

VICTOR F. LINDER.

References Cited in the file of this patent

UNITED STATES PATENTS

| Number | Name | Date |
| --- | --- | --- |
| 65,248 | Lyon | May 28, 1867 |
| 133,673 | Searls | Dec. 3, 1872 |
| 178,915 | Dunwald | June 20, 1876 |
| 445,294 | Treat | Jan. 27, 1891 |
| 1,265,345 | La Rock | May 7, 1918 |
| 2,047,322 | Hazelton | July 14, 1936 |
| 2,059,010 | Melin | Oct. 27, 1936 |